Jan. 12, 1932. V. G. APPLE 1,841,272
SAFETY CIRCUIT FOR AUTOMOTIVE ELECTRIC BRAKES
Filed July 26, 1928 2 Sheets-Sheet 2
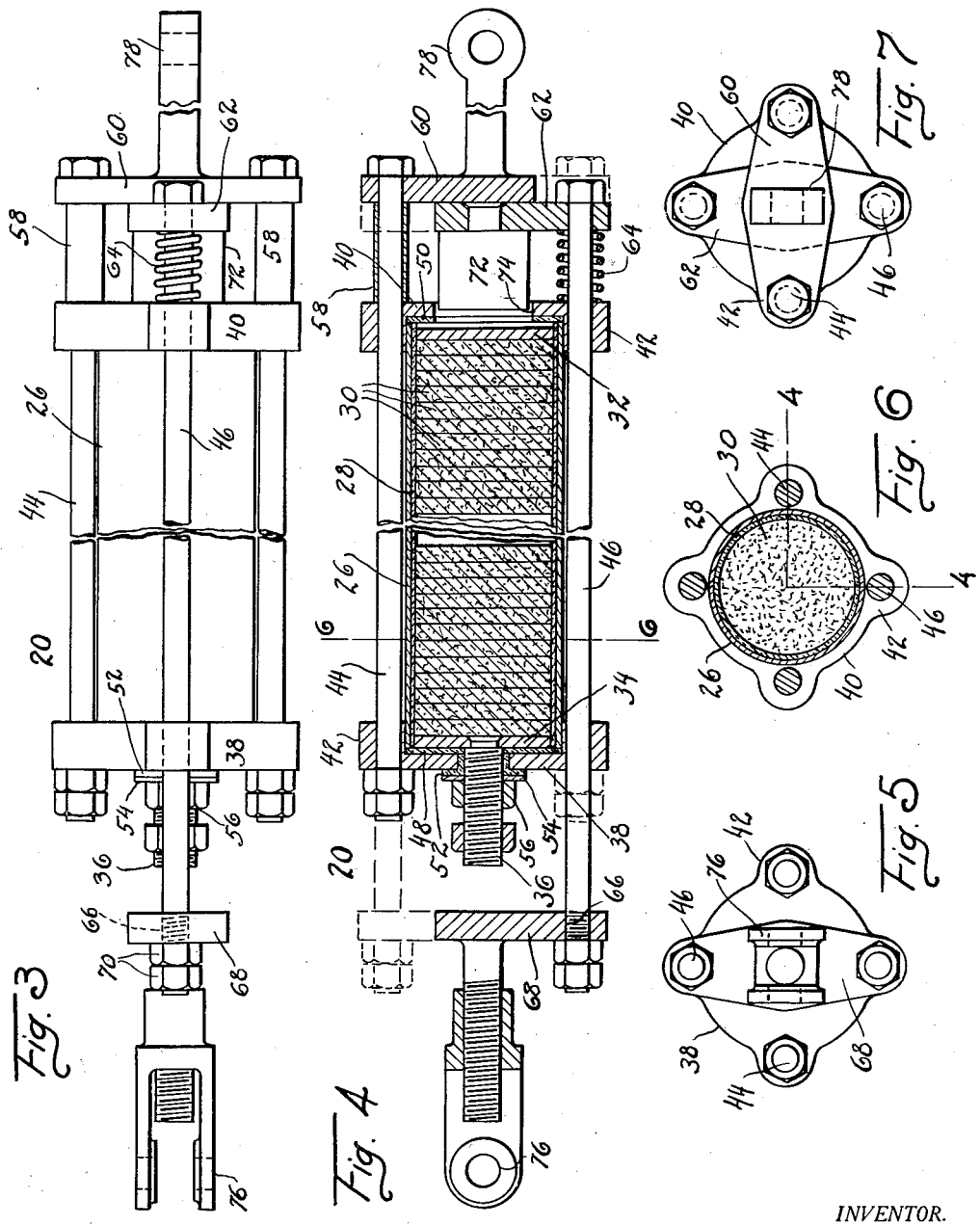
INVENTOR.
Vincent G. Apple
BY
Burton & McConkey
ATTORNEYS Patented Jan. 12, 1932

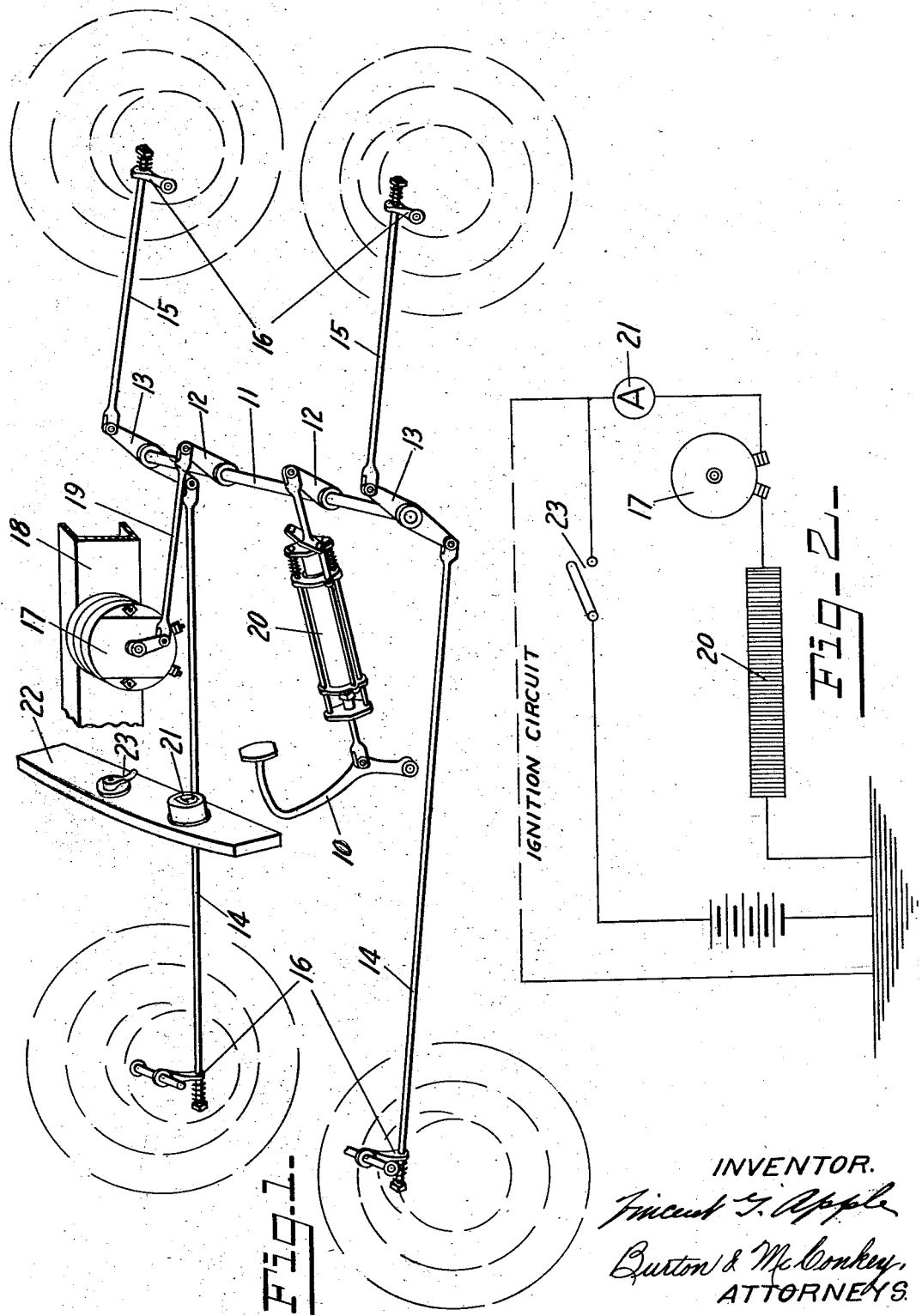

1,841,272

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

SAFETY CIRCUIT FOR AUTOMOTIVE ELECTRIC BRAKES

Application filed July 26, 1928. Serial No. 295,579.

My invention relates to improvements in control mechanism for electrically operated brakes of motor vehicles and an object consists in the provision of means automatically operable when the ignition circuit of the motor vehicle is shut off to simultaneously shut off the electric brake applying mechanism.

A meritorious feature resides in employing, in connection with electrically operated brakes operated through the usual brake controls, means automatically responsive to the switch controlling the ignition circuit of the motor vehicle whereby, upon shutting off the ignition, the electric brake applying mechanism will likewise be rendered ineffective so that unauthorized manipulation thereof, as by children when the vehicle is standing idle, will not result in electrically operating the brakes and exhausting the electric current thereby, as would ordinarily be the case.

Another object consists in attaining the objects heretofore named without requiring additional effort on the part of the operator of the vehicle in setting the brakes and without additional expense in initially equipping the vehicle with the mechanism.

The above objects and others, together with various meritorious advantages and features of my invention will more fully appear from the following description of the embodiment illustrated in the accompanying drawings and as defined in the claims.

In the drawings:—

Fig. 1 is a perspective view of a braking system wherein manual and electric means combine to apply the brakes, with a portion of the instrument board showing a conventional ignition switch.

Fig. 2 is a diagram of my improved circuit.

Fig. 3 is a plan view of the controller,

Fig. 4 is a right angle section through 4—4 of Fig. 6,

Fig. 5 and Fig. 7 are front and rear elevations respectively; and

Fig. 6 is a cross section taken at 6—6 of Fig. 4.

The pedal 10, brake shaft 11, brake shaft arms 12, brake shaft levers 13, brake rods 14 and 15 and levers 16 are such as are used in the ordinary manually operated braking system.

The electric brake operating unit 17 attached to side frame 18 and connected to an arm 12 on brake shaft 11 by rod 19 is similar both in structure and operation to that shown and described in my co-pending application (File #5321), Ser. No. 285,090, filed June 13, 1928.

In ordinary manually operable brakes the pedal 10 is connected to an arm 12 by a rod similar to rod 19, but in the system herein shown this rod is replaced by a controller 20, so constructed and connected in the electrical circuit, that the current through the electrical brake operating unit 17 is always maintained at a given ratio to the pressure being exerted on pedal 10 to manually operate the brakes.

The controller 20 comprises a length of tubing 26 lines with insulation 28 and filled with graphite discs 30, a plain metal end disc 32 and another metal end disc 34 having a binding post 36 secured thereto by riveting as shown. Metal caps 38 and 40, having ears 42 for bolts 44 and 46, telescope and enclose the ends of the tube, and insulation washers 48 and 50 both of a diameter equal to the outside of tube 26 cover its ends before caps 38 and 40 are put on.

Binding post 36 is insulated from the metal end cap 38 by insulation washers 48, 52, and 54, while nut 56 bearing against washers 52 and 54 secures the binding post to the cap 38.

Bolts 44 extending through ears 42 hold caps 38 and 40 rigidly against the ends of tube 26, and the bolts have sufficient additional length to extend at one end through small spacing tubes 58 and through the holes in member 60 to hold it in fixed relation to the tube 26 yet spaced apart therefrom.

Bolts 46 somewhat longer than bolts 44 extend through holes in plate 62, through springs 64, slidably through ears 42, then into tapped holes 66 in member 68 to which they are secured by lock nuts 70.

Plate 62 has metal contact plug 72 riveted thereto. This plug extends through opening 74 in end cap 40 to make contact with metal end disc 32 when springs 64 are suitably depressed.

From the foregoing description it is apparent that if the controller is attached at ends 76 and 78 and effort exerted to move these ends apart, so placing the mechanism in tension, the circuit will be first closed, then the resistance therein will be lowered, as the tension is increased, the circuit being from binding post 36 through the graphite discs and across their combined contact resistance to plug 72 and thence to a ground.

While the structure shown is adapted to a source of current supply having one terminal grounded, insulating the plug 72 from plate 62 and attaching a binding post to the plug would adapt it to a source of supply having both terminals insulated.

An ammeter 21 is placed on the instrument board 22 and registers the current flow in the circuit. The ammeter is preferably graduated in pounds of brake applying effort rather than in amperes, so that, by observation thereof, the operator may apply his brakes judiciously.

Switch 23 on instrument board 22 is a conventional ignition switch which may be locked to prevent the ignition system from functioning when the operator leaves the vehicle, and the manner in which the same switch is made to function also as a safeguard by opening the circuit through the electric brake operating element is one of the novel features of this invention.

The diagram Fig. 2 shows the circuit, from which it readily appears that the ignition switch controls both the ignition circuit and the circuit through the electric brake applying means.

It is obvious that with the arrangement shown the operator, upon leaving the vehicle, has only to shut off and lock the ignition switch as is his usual practice, when he will, at the same time, without extra effort, and without added equipment, have safeguarded the electric brake applying means against accidental application or against tampering, as by children, while the vehicle is standing idle.

The foregoing feature of my invention is highly important since the electric brake operating unit 17 draws a large volume of current which would not only heat and destroy the winding if left on continuously but would completely discharge the battery to its great injury.

While in the foregoing description and drawings I have shown and described but a single embodiment of my invention, it is not my intention to limit myself strictly to the specific embodiment shown, for it is obvious that both the manual and electric brake applying means may undergo considerable modification both in their structural configuration and in their relative arrangement without departing from the spirit of the invention or going beyond its intended scope.

I claim:

1. A safety circuit for automotive electric brakes comprising, a circuit through the electric brake operating means and the controller, a circuit through the ignition means, both circuits having one leg in common, and a switch in the common leg whereby a single operation of the driver opens both the ignition and the brake operating circuits.

2. A motor vehicle having brakes controlled by electrically operated connections, an electric circuit therefor, an ignition circuit, both circuits having one common leg, and a single switch in said common leg operable to make and break both circuits.

3. A motor vehicle having brakes, electrically operated mechanism connected therewith to apply the brakes, a circuit therefor including a source of electric power, an ignition circuit for the motor vehicle including the same source of electric power, said circuits having one common leg, and a switch in said common leg controlling both circuits.

4. A motor vehicle having, in combination, brakes, electrically operated mechanism connected therewith to apply the brakes including an electric power machine and an electric controller in series therewith in a circuit with a source of electric power, an ignition circuit for the motor, said two circuits having one leg in common, and a switch positioned in said common leg controlling both circuits to open and close them simultaneously.

5. A safety circuit for motor vehicle brakes, comprising, in combination, a motor vehicle having brakes, an electric power machine connected therewith to apply the brakes, a source of electric power in circuit with said power machine, an ignition circuit for the motor vehicle connected with the same source of power, said two circuits having one leg in common, a switch in said leg controlling said two circuits and a brake effort indicator positioned in the first circuit.

6. A safety circuit for motor vehicle brakes, comprising, in combination, a motor vehicle having brakes, an electric power machine connected with the brakes to apply them, a source of electric power in circuit with said power machine, an electric controller in said circuit between the source of power and the power machine, an ignition circuit for the motor vehicle, said two circuits having one leg in common, a switch located in said common leg to open and close both circuits simultaneously and a brake effort indicator included in the first mentioned circuit.

7. A motor vehicle having wheels provided with brakes, a brake pedal connected mechanically by linkage with the brakes to apply the brakes, an electric power machine connected in part through the same linkage with the brakes to apply the brakes, an electric controller for the power machine forming a part of said mechanical linkage between the pedal and the brakes and responsive to the pedal pressure to control the electric power delivered to the power machine, a source of electric power, an electric circuit including said source of power the electric controller and the electric power machine, an ignition circuit for the vehicle, said two circuits having one leg in common, a lockable switch in said common leg operable to open and close both circuits simultaneously.

8. Brake mechanism for a motor vehicle having, in combination, brakes, an ignition circuit, an electric circuit including operating mechanism coupled with brakes to exert brake applying effort thereon, and a manually operable control switch arranged in both circuits to simultaneously make and break both circuits.

9. Brake mechanism for a motor vehicle having, in combination, brakes, two electric circuits including a control switch common to both, one circuit including power means coupled with the brakes to exert brake applying effort thereon and responsive to the actuation of the control switch of the other circuit to be broken or made thereby with the other circuit.

10. Brake mechanism for a motor vehicle having, in combination, brakes, an ignition circuit provided with a control switch, manually operable mechanism and power mechanism coupled with the brakes to exert brake applying effort thereon, electrical means controlling said power mechanism including in part said control switch whereby the power mechanism is energized or deenergized simultaneously with the making and breaking of the ignition circuit.

11. Brake mechanism for a motor vehicle having, in combination, brakes, an ignition circuit provided with a control switch, manually operable mechanism coupled with the brakes to apply the brakes, power mechanism coupled with the brakes to apply the brakes including part of said manual mechanism, said power mechanism responsive to the ignition circuit control switch whereby it is operable only when the ignition circuit is closed.

12. Brake mechanism for a motor vehicle having, in combination, brakes, an ignition circuit provided with a manually operable control switch, power mechanism coupled with the brakes to exert brake applying effort thereon, a source of power for said power mechanism, means controlling the delivery of power from said source to said power mechanism including in part said control switch whereby power is cut off therefrom simultaneously with the breaking of the ignition circuit.

13. Brake mechanism for a motor vehicle having, in combination, brakes, an ignition circuit provided with a control switch, a manually operable brake applying member coupled through mechanical linkage with the brakes to exert brake applying effort thereon, power mechanism coupled with the brakes to exert brake applying effort thereon, a source of power coupled with said power mechanism to deliver power thereto through means including in part said control switch whereby the delivery of power to the power mechanism is regulated in accordance with the making and breaking of the ignition circuit.

14. Brake mechanism for a motor vehicle having, in combination, brakes, an ignition circuit, a switch in said circuit, a manually operable brake applying member coupled with the brakes to exert brake applying effort thereon, power means coupled with the brakes to exert applying effort thereon, said power means responsive to the brake applying member to be brought into operation thereby and responsive to the switch in the ignition circuit to respond thereto to be brought into operation only when the ignition circuit is closed.

15. Brake mechanism for a motor vehicle having, in combination, brakes, an ignition circuit, a switch in said circuit, power mechanism coupled with the brakes to exert brake applying effort thereon, a manually operable brake applying member coupled with the brakes through said power mechanism to bring said power mechanism into operation to exert brake applying effort on the brakes, said power mechanism responsive to said ignition switch to be incapable of power operation when the ignition circuit is broken.

16. Brake mechanism for a motor vehicle having, in combination, brakes, an ignition circuit, a switch in said circuit, power mechanism coupled with the brakes to exert brake applying effort thereon, a manually operable brake applying member coupled with the brakes through said power mechanism to apply the brakes mechanically and to bring said power mechanism into operation to exert brake applying effort on the brakes, said power mechanism responsive to said ignition switch to be incapable of power operation when the ignition circuit is broken.

17. Brake mechanism for a motor vehicle having, in combination, brakes, an ignition circuit provided with a manually operable control switch, power mechanism coupled with the brakes to exert brake applying effort thereon, and means controlling said power device including in part said control switch whereby the power mechanism is effective only when the control switch is on.

18. Brake mechanism for a motor vehicle having, in combination, brakes, an ignition circuit provided with a manually operable control switch, power mechanism coupled with the brakes to exert brake applying effort thereon, and means controlling said power mechanism including in part said control switch whereby the power mechanism is ineffective when the ignition circuit is open and may be rendered effective when the ignition switch is closed.

19. Brake mechanism for a motor vehicle having, in combination, brakes, an ignition circuit provided with a manually operable control switch, power mechanism coupled with the brakes to exert brake applying effort thereon, means controlling said power mechanism including in part said control switch whereby the power mechanism is ineffective when the ignition switch is open and may be rendered effective when the ignition switch is closed, and an auxiliary operating member operable when the ignition switch is closed to render said power mechanism effective.

20. Brake mechanism for a motor vehicle having, in combination, brakes, an ignition circuit provided with a manually operable control switch, power mechanism coupled with the brakes to exert brake applying effort thereon, and means controlling said power mechanism including said control switch and an auxiliary operating member operable to render the power means effective when the control switch is closed.

21. Brake mechanism for a motor vehicle having, in combination, brakes, an ignition circuit provided with a manually operable control switch, power mechanism coupled with the brakes to exert brake applying effort thereon, and means controlling said power mechanism including said control switch and an auxiliary operating member operable to render the power means effective only when the control switch is closed.

22. Brake mechanism for a motor vehicle having, in combination, brakes, an ignition circuit provided with a manually operable control switch, power mechanism coupled with the brakes to exert brake applying effort thereon, and means controlling said power mechanism including said control switch and an auxiliary operating member operable to render the power means effective when the control switch is closed, said auxiliary operating member coupled with the brakes to exert brake applying effort thereon regardless of the power means.

23. Brake mechanism for a motor vehicle having, in combination, brakes, an ignition circuit provided with a manually operable control switch, power mechanism coupled with the brakes to exert brake applying effort thereon, and means controlling said power mechanism including said control switch and an auxiliary operating member operable to render the power means effective when the control switch is closed, said auxiliary operating member coupled with the brakes to exert brake applying effort thereon regardless of the position of the ignition switch.

24. Brake mechanism for a motor vehicle having, in combination, brakes, an ignition circuit provided with a manually operable control switch, power mechanism coupled with the brakes to exert brake applying effort thereon, and means controlling said power mechanism including said control switch and an auxiliary operating member operable to render the power means effective when the control switch is closed, said auxiliary operating member coupled with the brakes to exert brake applying effort thereon when the ignition switch is off.

25. Brake mechanism for a motor vehicle having, in combination, brakes, an ignition circuit provided with a manually operable control switch, power mechanism coupled with the brakes to exert brake applying effort thereon, and means controlling said power mechanism including said ignition switch and a manually operable brake applying member.

26. Brake mechanism for a motor vehicle having, in combination, brakes, an ignition circuit provided with a manually operable control switch, power mechanism coupled with the brakes to exert brake applying effort thereon, and means controlling said power mechanism including said ignition switch and a manually operable brake applying tension connection.

27. Brake mechanism for a motor vehicle having, in combination, brakes, an ignition circuit provided with a manually operable control switch, power mechanism coupled with the brakes to exert brake applying effort thereon, and means controlling said power mechanism including said ignition switch and a manually operable brake applying tension connection effective when the ignition switch is on to cause said power means to exert brake applying effort on the brakes.

28. Brake mechanism for a motor vehicle having, in combination, brakes, an ignition circuit provided with a manually operable control switch, power mechanism coupled with the brakes to exert brake applying effort thereon, means controlling said power mechanism including a manually operable brake applying tension connection effective when the tension transmitted thereby equals a predetermined quantity to cause said power means to exert brake applying effort on the brakes.

In testimony whereof, I, VINCENT G. APPLE, sign this specification.

VINCENT G. APPLE.